United States Patent [19]

Stumpf

[11] Patent Number: 4,721,020
[45] Date of Patent: Jan. 26, 1988

[54] SKI SHARPENING GUIDE AND METHOD OF EMPLOYING SAME

[76] Inventor: Gary B. Stumpf, 27 Guernsey Hollow, Stockbridge, Vt. 05772

[21] Appl. No.: 923,554

[22] Filed: Oct. 27, 1986

[51] Int. Cl.$^4$ .................. B23D 69/02; B24B 9/04
[52] U.S. Cl. ........................................ 76/83; 76/88; 51/205 WG
[58] Field of Search ............... 76/83, 82, 88, 82.2, 76/82.1; 51/205 WG, 281 R

[56] References Cited

U.S. PATENT DOCUMENTS

| | | | |
|---|---|---|---|
| 559,333 | 4/1896 | Johnson | 76/88 |
| 564,403 | 7/1896 | Whitney | 76/88 |
| 803,689 | 11/1905 | Harvey et al. | 76/82.2 |
| 3,391,946 | 7/1968 | Luff . | |
| 3,670,601 | 6/1972 | Weeks | 76/83 |
| 3,693,219 | 9/1972 | Falkenberg | 51/205 WG |
| 3,875,825 | 4/1975 | Buttafuoco | 76/88 |
| 3,991,429 | 11/1976 | Hanover | 76/83 |
| 4,030,382 | 6/1977 | Nilsson et al. | 76/83 |
| 4,280,378 | 7/1981 | Levine | 76/83 |
| 4,442,636 | 4/1984 | Obland | 76/83 |
| 4,509,297 | 4/1985 | Lindgren | 76/83 |

Primary Examiner—Roscoe V. Parker
Attorney, Agent, or Firm—Caesar, Rivise, Bernstein, Cohen & Pokotilow, Ltd.

[57] ABSTRACT

A ski sharpening guide in the form of an angle member having an outer upper surface for supporting a cutting tool and a rear output surface for engaging the bottom of the ski during the sharpening operation. The junction between the upper surface and rear surface is a sharp edge and a chip-receiving recess or slot is provided in the upper surface for collecting metal filings. A method of employing the ski sharpening guide for sharpening the metal edges of a ski also forms a part of the present invention.

9 Claims, 5 Drawing Figures

U.S. Patent   Jan. 26, 1988   4,721,020
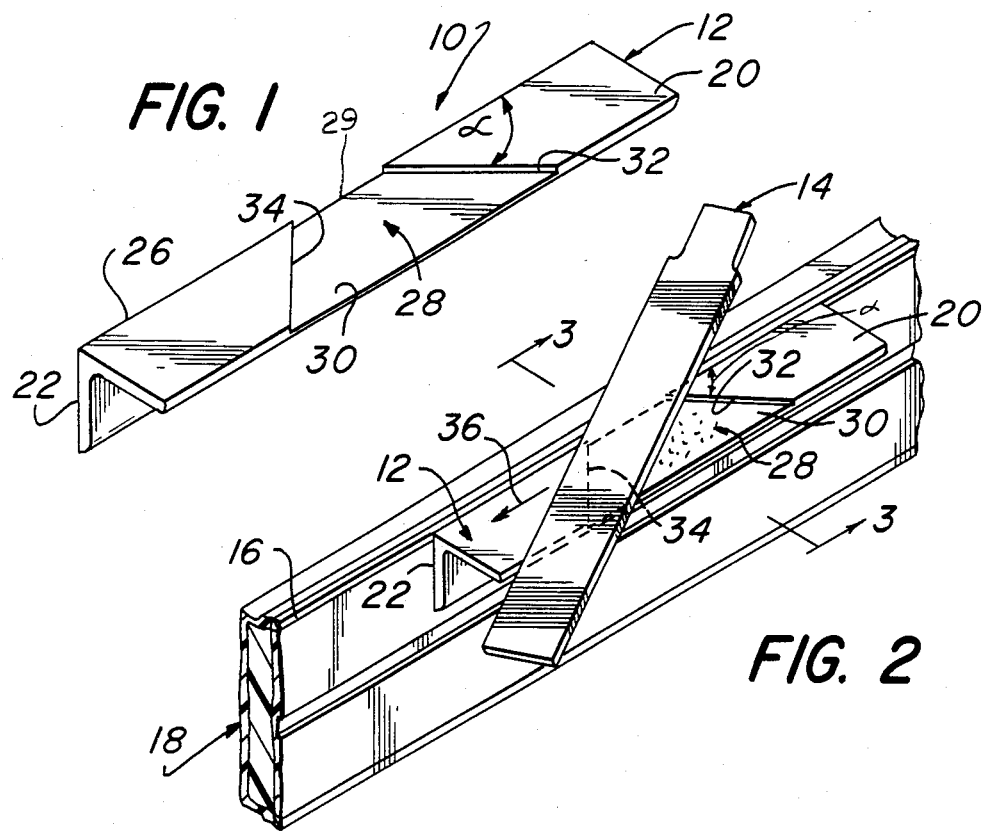
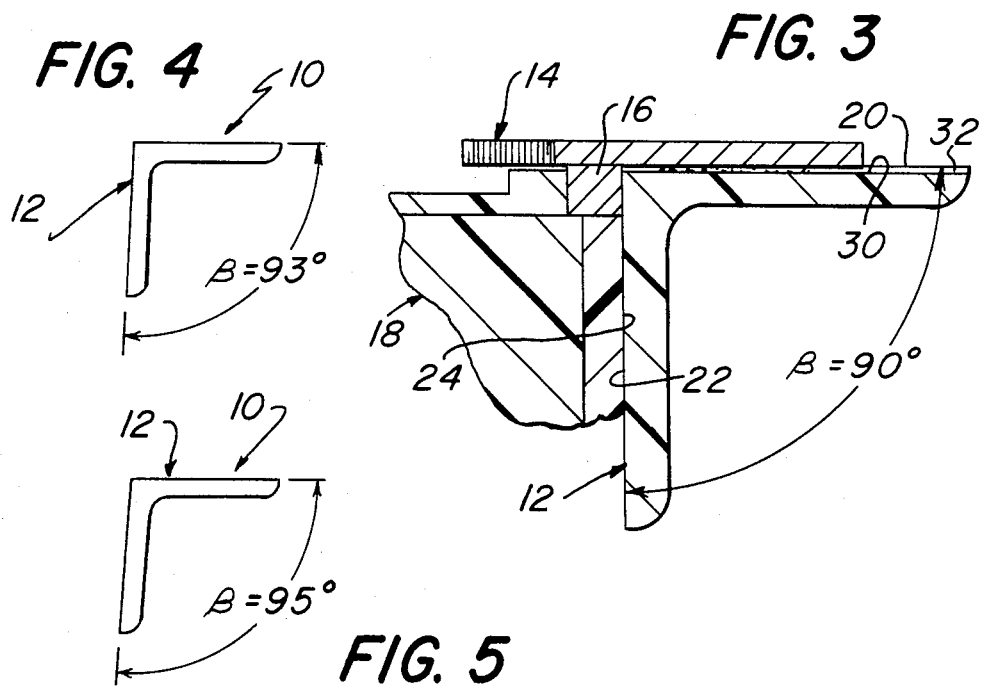

SKI SHARPENING GUIDE AND METHOD OF EMPLOYING SAME

FIELD OF THE INVENTION

This invention relates generally to a ski sharpening guide and method of employing same, and more specifically to a ski sharpening guide and method of using the same for the purpose of sharpening metal edges of a ski.

BACKGROUND ART

In order to obtain the benefits of using well-tuned skis, which generally is important to all skiers, and particularly to proficient downhill skiers, the steel edges of the skis need to be maintained in a smooth, sharp condition to provide consistent edge bite. Moreover, the edge angle desirably should be maintained between 85 degrees and 90 degrees, with the specific angle depending upon the skier's preference and upon snow conditions.

A number of different prior art cutting devices have been proposed for sharpening the metal edges of skis. Some of these devices employ conventional files, while other devices employ special cutters. Moreover, some of the cutting devices are designed to sharpen only the outer edges, whereas other devices are designed to simultaneously smooth the outer metal edges and the bottom surface of the skis. These various prior art devices are believed to be either undesirably complex or undesirably expensive, and most suffer from the deficiency of being limited for use in sharpening the edge only to a 90 degree angle. Moreover, those devices which simultaneously cut the outer edges and the bottom of a ski usually employ cutters which form a corner region or pocket into which metal filings can flow. This reduces the effectiveness of the cutter and also creates a situation wherein the metal filing may become embedded in the base of the ski to thereby adversely effect the gliding properties of the ski.

Typical prior art ski sharpening devices are disclosed in the following patents:

| Inventor | U.S. Pat. No. |
| --- | --- |
| R. Luff | 3,391,946 |
| F. G. Weeks | 3,670,601 |
| D. R. Falkenberg | 3,693,219 |
| B. P. Buttafuoco | 3,875,825 |
| E. Hanover | 3,991,429 |
| A. I. Levine | 4,280,378 |
| D. R. Obland | 4,442,636 |
| E. V. Lindgren | 4,509,297 |

Knife sharpeners employing a file and grooves for receiving filings are disclosed in U.S. Pat. Nos. 559,333, issued to Johnson, and 564,403, issued to Whitney.

OBJECTS OF THE INVENTION

It is a general object of this invention to provide a ski sharpening guide which is simple in construction and easy to use.

It is another object of this invention to provide a ski sharpening guide which can be employed with a conventional file to both sharpen the metal edge of a ski and provide a desired edge angle.

It is a further object of this invention to provide a ski sharpening guide that can be utilized in connection with commercially available files or other polishing or cutting devices.

It is a further object of this invention to provide a ski sharpening guide that is light in weight and small enough to be carried with every day ski accessories.

It is a further object of this invention to provide a ski sharpening guide which is simple to use; requiring no special skill.

It is a further object of this invention to provide a ski sharpening guide that can be employed in connection with a cutting tool to provide either a fast cutting operation or a simple polishing operation, depending upon the type of cutter used and the hand pressure applied by the operator.

It is a further object of this invention to provide a ski sharpening guide which prevents the build-up of metal filings at the area being sharpened, which filings could become embedded in the plastic base of the ski, thereby adversely effecting the gliding properties of the ski.

SUMMARY OF THE INVENTION

The above and other objects of this invention are provided by a ski sharpening guide in the form of an angle member having an upper surface for supporting a cutting tool, such as a file, and a rear surface for engaging the bottom of a ski during a sharpening operation. The upper surface of the guide is provided with a chip-receiving recess or slot therein, and the cutting tool overlies this slot while supported on the upper surface of the angle member during a cutting operation.

The sharpening operation is carried out by positioning a file or similar cutting tool on the upper surface of the angle member, with a cutting section of the tool overlying the chip-receiving recess and being adapted to engage and sharpen a metal edge of the ski. At the same time that the cutting tool is maintained in engagement with the upper surface of the angle member and the edge of the ski to be cut, the rear surface of the angle member is pressed against the bottom surface of the ski and is slid longitudinally along the ski to thereby cause the file to provide the desired sharpening operation on the metal ski edge. Filings removed from the ski edge during the sharpening operation are directed into the chip-receiving recess to prevent a build-up of these filings adjacent the surface of the ski being sharpened, to thereby prevent damage to the ski which can be caused by metal filings becoming embedded in the plastic base thereof.

BRIEF DESCRIPTION OF THE DRAWINGS

Other objects and many of the attendent advantages of this invention will be readily appreciated as the same becomes better understood by reference to the following detailed description when considered in connection with the accompanying drawings wherein:

FIG. 1 is an isometric view of the ski sharpening guide in accordance with this invention;

FIG. 2 is an isometric view showing the cooperative arrangement between a ski, the sharpening guide of this invention and a conventional file, during the step of sharpening a metal edge of the ski;

FIG. 3 is a sectional view taken along line 3—3 of FIG. 2;

FIG. 4 is an end elevational view of a second embodiment of a ski sharpening guide in accordance with this invention; and FIG. 5 is an end elevational view of a third embodiment of a ski sharpening guide in accordance with this invention.

DESCRIPTION OF THE PREFERRED EMBODIMENT OF THE INVENTION

Referring now in greater detail to the various figures of the drawings wherein like reference characters refer to like parts, a ski sharpening guide embodying the present invention is generally shown at 10 in FIG. 1. The device 10 basically comprises an angle member 12 which is adapted to be employed in conjunction with a cutter, such as a conventional file 14, for sharpening or otherwise adjusting the edge angle of metal edges 16 of a ski 18. The angle member 12 can be made of any suitable plastic or metal material, and in the present embodiment is made of aluminum.

Unless specifically indicated otherwise reference in this application to "sharpening" metal edges of the ski includes within its scope the adjusting of the edge angle of such metal edges.

Referring to FIGS. 1 through 3, the angular member 12 includes an upper surface 20 for supporting the file 14 thereon, and a rear surface 22 for engaging the bottom 24 of the ski 18. The junction between the upper surface 20 and the rear surface 22 of the angle member 12 is a sharp (as opposed to rounded) edge 26. This is an important feature of the invention, since a rounded junction between the upper surface 20 and the rear surface 22 would result in the creation of a chip-collecting pocket between the ski bottom 24 and the angle member 12. As can be seen best in FIG. 3, the provision of a sharp edge 26 at the junction of the upper surface 20 and the rear surface 22 provides close conformity between the angle member 12 and ski bottom 24, to thereby prevent the formation of such a chip-collecting pocket in which metal filings or chips could build up, and interfere with the sharpening operation, for example, by becomming embedded in the plastic base of the ski.

As can be seen best in FIG. 2 a chip-receiving recess or slot 28 is provided in the upper surface 20 of the angle member 12, and includes a bottom wall 30 extending through the rear surface 22 of the angle member to define a sharp (as opposed to a rounded) edge 29 with the rear surface 22. The sharp edge 29 provides the same beneficial function as the edge 26 described earlier. Preferably the dimension of the slot 28 adjacent the edge 29 and in a direction parallel thereto is approximately 2 inches (5.04 cm).

the recess 28 also includes angled side walls 32 and 34, which preferably are disposed at an acute angle to the rear surface 22 (and edge 29) of the angle member; angling away from each other in a direction outwardly of the rear surface 22. This angled relationship assists in moving the filings away from the junction 29 of the rear surface 22 with the bottom wall 30 of the angle member 12 so that the filings will not interfere with the sharpening operation, by possibly "chewing up" the ski adjacent the area being sharpened, and also by becomming embedded in the plastic base of the ski. In the illustrated embodiment the acute angle $\alpha$ between each side wall 32 and the adjacent rear wall 22 is 45°.

Referring specifically to FIG. 2, the sharpening operation is carried out by positioning file 14, or other cutting or polishing tool, on the upper surface 20 of the angle member 12, with a cutting or polishing surface of the tool overlying the chip-receiving recess 28 and also extending outwardly beyond the edge 26 to be in a position for engaging a metal edge 16 to be sharpened. During the sharpening operation the rear surface 22 of the angle member 12 is pressed against the bottom 24 of the ski, and is slid longitudinally along the ski in the direction indicated by arrow 36 to provide the desired sharpening operation on the adjacent metal ski edge 16.

It should be noted that the file 14 actually cooperates with the angle member 12 to aid in establishing the desired position of the file relative to the metal edge 16. In this regard the engagement of the file 14 with the upper surface 20 of the angle member, accompanied by the fact that the file engages the metal edge 16 by extending beyond the edge 26 of said angle member, aides in establishing the desired orientation and position of the sharpening guide 10 as it is moved along the metal edge 16 to provide a desired sharpening operation.

As filings are removed from the ski edge 16 they are directed into the chip-receiving recess 28 to thereby prevent a build-up of metal filings adjacent the ski edge being cut. As explained earlier, a build-up of such filings can cause them to become embedded in the plastic base of the ski, thereby adversely effecting the gliding properties of the ski.

Most desirably the metal edges 16 of a ski are maintained at an angle between 85° and 90°, depending upon the preference of the skier and upon the specific snow conditions. In accordance with this invention different sharpening guides are employed to sharpen or cut different edge angles into the metal edges 16, with the angle between the upper surface 20 and rear surface 22 of the guide being the supplement of the angle to be maintained on the ski edge 16. Thus, as can be seen in FIG. 3, an angle $\beta$ of 90° is established between the upper surface 20 and rear surface 22 to provide a 90° edge angle in the metal edge 16 of the ski. In FIG. 4 the angle $\beta$ is 93°, and is employed to form an angle of 87° in the ski edge 16, whereas the angle $\beta$ in FIG. 5 is 95°, to form an 85° angle in the metal edge 16. Due to the extremely lightweight construction of the ski guide 10 it is extremely easy for a skier to carry one of these tools, along with a whetstone, to permit quick polishing or touch-ups of the metal edge during the skiing day.

Without further elaboration, the foregoing will so fully illustrate my invention that others may, by applying current or future knowledge, adopt the same for use under various conditions of service.

I claim:

1. A ski sharpening guide comprising an angle member having an outer, upper surface for supporting a cutting tool and an outer rear surface for engaging a bottom of a ski during a sharpening operation, said upper surface including a chip-receiving recess therein, said recess having a bottom wall spaced from the upper surface of the angle member, whereby a cutting tool supported on said upper surface will be spaced from the bottom wall of the recess.

2. The ski sharpening guide of claim 1, further including a sharp edge at the junction of the upper surface and rear surface of said angle member.

3. The ski sharpening guide of claim 1 wherein said chip-receiving recess extends through the rear surface of said angle member to define a sharp edge at the junction of said rear surface and the bottom wall of said recess.

4. The ski sharpening guide of claim 3 wherein said chip-receiving recess includes side walls joining said bottom wall and being disposed at an acute angle to the rear surface of the angle member, said side walls angling away from each other in a direction extending outwardly from said rear surface.

5. The ski sharpening guide of claim 2 wherein the angle between the upper and rear surfaces is between about 90° to about 95°.

6. The ski sharpening guide of claim 2 wherein the angle between the upper and rear surfaces is greater than 90°.

7. The ski sharpening guide of claim 1 wherein the upper and rear surfaces of the angle member are outer surfaces of the guide.

8. A method of sharpening a metal edge of a ski including the steps of:
   (a) providing an angle member having an outer upper surface for supporting a cutting tool, an outer rear surface for engaging a bottom of a ski during the sharpening of said metal ski edge and a chip-receiving recess provided in the upper surface, said chip-receiving recess having a bottom wall spaced from the upper surface of the angle member;
   (b) positioning a flat cutting tool in engagement with the upper surface of said angle member with a portion of said cutting tool overlying at least a portion of the chip-receiving recess during the sharpening of the metal edge of the ski and with a section of the cutting tool extending beyond the junction of the upper surface and rear surface of said angle member for engaging the metal ski edge to be sharpened;
   (c) positioning the section of the cutting tool extending beyond said junction into engagement with the metal edge of the ski to be cut while simultaneously positioning the rear surface of the angle member in engagement with the bottom of said ski; and
   (d) sliding the ski sharpening guide, with the cutting tool in engagement therewith, in a longitudinal direction for sharpening the metal edge of the ski.

9. The method of claim 8 wherein the ski sharpening guide and cutting tool are moved as a single unit, without relative movement between them, during the cutting operation.

* * * * *